(12) United States Patent
Cerezo Arce et al.

(10) Patent No.: US 9,033,695 B2
(45) Date of Patent: May 19, 2015

(54) INJECTION INTERFACE DEVICE

(71) Applicant: Airbus Operations S.L., Getafe (ES)

(72) Inventors: David Alfonso Cerezo Arce, Getafe (ES); Melania Sanchez Perez, Getafe (ES); Aquilino Garcia Garcia, Getafe (ES)

(73) Assignee: Airbus Operations S.L., Getafe (Madrid) (ES)

( * ) Notice: Subject to any disclaimer, the term of this patent is extended or adjusted under 35 U.S.C. 154(b) by 0 days.

(21) Appl. No.: 14/337,678

(22) Filed: Jul. 22, 2014

(65) Prior Publication Data
US 2015/0030715 A1   Jan. 29, 2015

(30) Foreign Application Priority Data
Jul. 26, 2013   (EP) ...................................... 13382306

(51) Int. Cl.
*B29C 45/17*   (2006.01)
(52) U.S. Cl.
CPC .................................. *B29C 45/1777* (2013.01)
(58) Field of Classification Search
CPC ................................................... B29C 45/1777
See application file for complete search history.

(56) References Cited

U.S. PATENT DOCUMENTS

| | | | | |
|---|---|---|---|---|
| 2,456,349 A * | 12/1948 | Ward | ............................... | 70/181 |
| 4,737,093 A * | 4/1988 | Hori et al. | ..................... | 425/151 |
| 4,917,595 A * | 4/1990 | Nakamura et al. | ............. | 425/567 |
| 5,035,599 A * | 7/1991 | Harashima et al. | ........... | 425/150 |
| 5,040,969 A * | 8/1991 | von Buren et al. | ............. | 425/572 |
| 5,044,927 A * | 9/1991 | DiSimone et al. | ............. | 425/567 |
| 5,078,588 A * | 1/1992 | Takeuchi | ....................... | 425/562 |
| 5,215,762 A * | 6/1993 | Eder et al. | ..................... | 425/130 |
| 5,312,241 A * | 5/1994 | Gunther | ......................... | 425/549 |
| 2005/0158042 A1* | 7/2005 | Verrilli | ........................... | 392/473 |
| 2006/0006563 A1* | 1/2006 | Serniuck et al. | ............. | 264/40.1 |
| 2008/0057150 A1 | 3/2008 | Harper | | |
| 2008/0145473 A1* | 6/2008 | Eigler et al. | ................... | 425/575 |
| 2012/0171321 A1 | 7/2012 | Blot et al. | | |
| 2012/0219651 A1* | 8/2012 | Weber et al. | .................. | 425/149 |
| 2014/0248387 A1* | 9/2014 | Weber et al. | .................. | 425/162 |

FOREIGN PATENT DOCUMENTS

| | | |
|---|---|---|
| JP | H0319814 A | 1/1991 |
| WO | 2005056261 | 6/2005 |
| WO | 2009144098 | 12/2009 |

OTHER PUBLICATIONS

European Search Report, Dec. 19, 2013.

* cited by examiner

*Primary Examiner* — Yogendra Gupta
*Assistant Examiner* — Emmanuel S Luk
(74) *Attorney, Agent, or Firm* — Greer, Burns & Crain Ltd.

(57) ABSTRACT

An injection interface device comprising a wedge having a first surface mountable over the joint between the mold and the terminal element and a second surface being inclined with respect to the first surface. A fixation element is mountable against the second surface and an attachment element. The device is configured so that it avoids or prevents the movement of the wedge in a direction parallel to the mold and the movement of the fixation element in a direction perpendicular to the mold so that a displacement of the fixation element parallel to the mold makes a displacement of the wedge in a direction perpendicular to the mold so that the wedge presses against the terminal element to seal it.

8 Claims, 3 Drawing Sheets

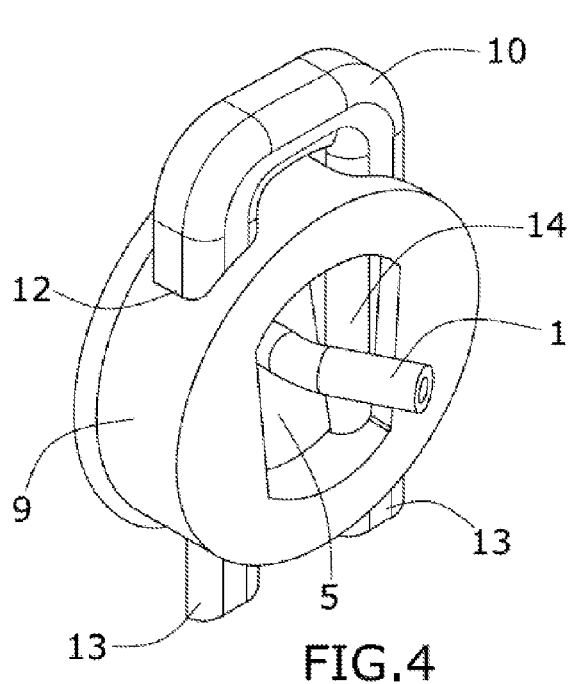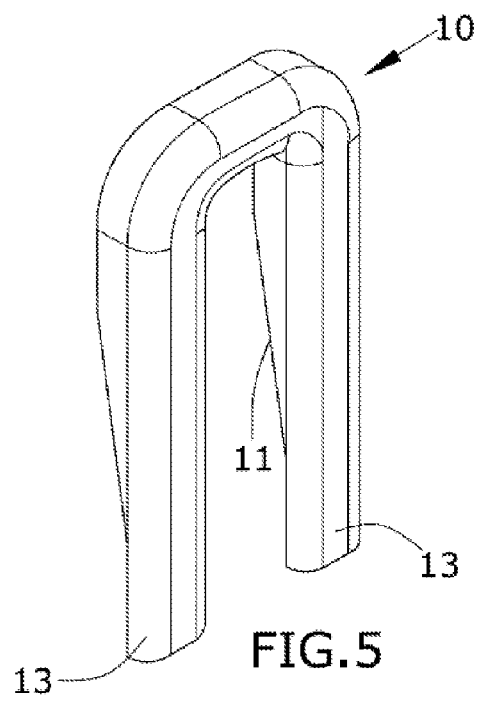

INJECTION INTERFACE DEVICE

CROSS-REFERENCES TO RELATED APPLICATIONS

This application claims the benefit of the European patent application No. 13382306.2 filed on Jul. 26, 2013, the entire disclosures of which are incorporated herein by way of reference.

BACKGROUND OF THE INVENTION

The present invention is directed to an injection interface device for connecting an injection tube to a mold. Particularly it is intended for manufacturing products in plastics or composite material by injection/infusion methods, for instance Resin Transfer Molding (RTM) or Liquid Resin Infusion (LRI) processes.

Plastic or resin infusion/injection is becoming a reliable and economic method for manufacturing large pieces having complex shapes. Some examples are beams and frames, manufactured with RTM, which are currently being developed for the aircraft industry.

A known method consists of inserting resin pipes into the inlets of a mold through a port of said mold and clamping them together. This known method is not only time consuming, but it also involves some drawbacks like resin solidification within the channels and the fact that the clamps may cause pipe breakages, as well as vacuum leakage.

Document US 2012/0171321, which is also known, discloses an injection interface device that solves some of the previously mentioned drawbacks. It makes a more reliable interface device in terms of sealing and it is also easier to assemble and/or disassemble for cleaning or replacement. The dismountable assembly comprises screw-on pieces for sealing the joint between the mold and the injection pipe.

More specifically it discloses an interface device mountable between an injection tube and a mold, the injection tube comprising a terminal element at its end. The interface device comprises a metallic screwed piece and a second screwed piece both located around the injection tube so that by screwing the metallic screwed piece against the second screwed piece, the injection tube and its terminal element are pressed against the mold to seal it.

Said previously mentioned pieces are pre-assembled so that the connection of the injection tube to the mold is rapidly performed. Said pre-assembly is complex and it is performed by the supplier, therefore the interface device has to return to the supplier after use and any maintenance tasks must be performed by the supplier, thus leading to high cost and burden on logistics.

SUMMARY OF THE INVENTION

The above mentioned drawbacks are solved by the claimed injection interface device.

The injection interface device is mountable between an injection tube and a mold provided with an injection hole. The injection tube comprises a terminal element at its end so that the terminal element is able to be introduced into the injection hole for forming a seal between the injection hole and the terminal element. Said terminal element can be mounted at the end of the injection tube or can be welded or co-injected into its end.

The injection interface device object of the invention comprises:

A wedge comprising a first surface mountable against the terminal element and a second surface inclined with respect to the first surface.

A fixation element comprising a surface mountable against the second surface of the wedge and movable with respect to said second surface. The fixation element presses the wedge, which also presses the terminal element sealing the joint between the mold and the terminal element.

An attachment element configured so that it avoids or prevents the movement of the wedge in a direction parallel to the mold surface and also configured so that it avoids or prevents the movement of the fixation element in a direction perpendicular to the mold.

The wedge, the fixation element and the attachment element are configured so that a displacement of the fixation element parallel to the mold produces a displacement of the wedge in a direction perpendicular to the mold so that the wedge presses against the terminal element to seal the joint between the injection hole and the terminal element.

The claimed injection interface device simplifies the way injection/infusion pipes are connected to the mold inlets.

The claimed invention also speeds up the connection time between the injection pipes and the mold as only a displacement parallel to the mold of the fixation element is needed to perform the sealing so that the way they are connected is simpler and faster, allowing the connection with just one movement.

Moreover, the injection interface device of the invention comprises a smaller number of elements than the known devices reducing the number of loose pieces down to just one. In one embodiment, the fixation element can be the only metallic and expensive piece and moreover it is not disposable. It also reduces the number of steps of the injection process.

Additionally no screwed pieces are needed, thus leading to less maintenance tasks and less breakages due to resin being trapped in the thread connections and it also improving the quality of the seal.

There is also a logistic advantage which is not negligible. With this injection device, the fixation element doesn't need to be pre-assembled to the wedge, the terminal element and the injection pipe. As the fixation element, which is usually metallic, can be easily removed from these pieces it can be re-used in next operations while the wedge, the terminal element and the injection pipe are disposable so that none of the pieces returns to the supplier.

Finally, the claimed invention also reduces the cost of manufacturing composite material pieces due to the previously mentioned advantages.

BRIEF DESCRIPTION OF THE DRAWINGS

To complete the description and in order to provide for a better understanding of the invention, a set of drawings is provided. Said drawings form an integral part of the description and illustrate preferred embodiments of the invention. The drawings comprises the following figures:

FIG. 4 is a perspective view of the embodiment shown in FIG. 2.

FIG. 5 is a perspective view of an embodiment of the fixation element.

DETAILED DESCRIPTION OF THE PREFERRED EMBODIMENTS

Figure 1:
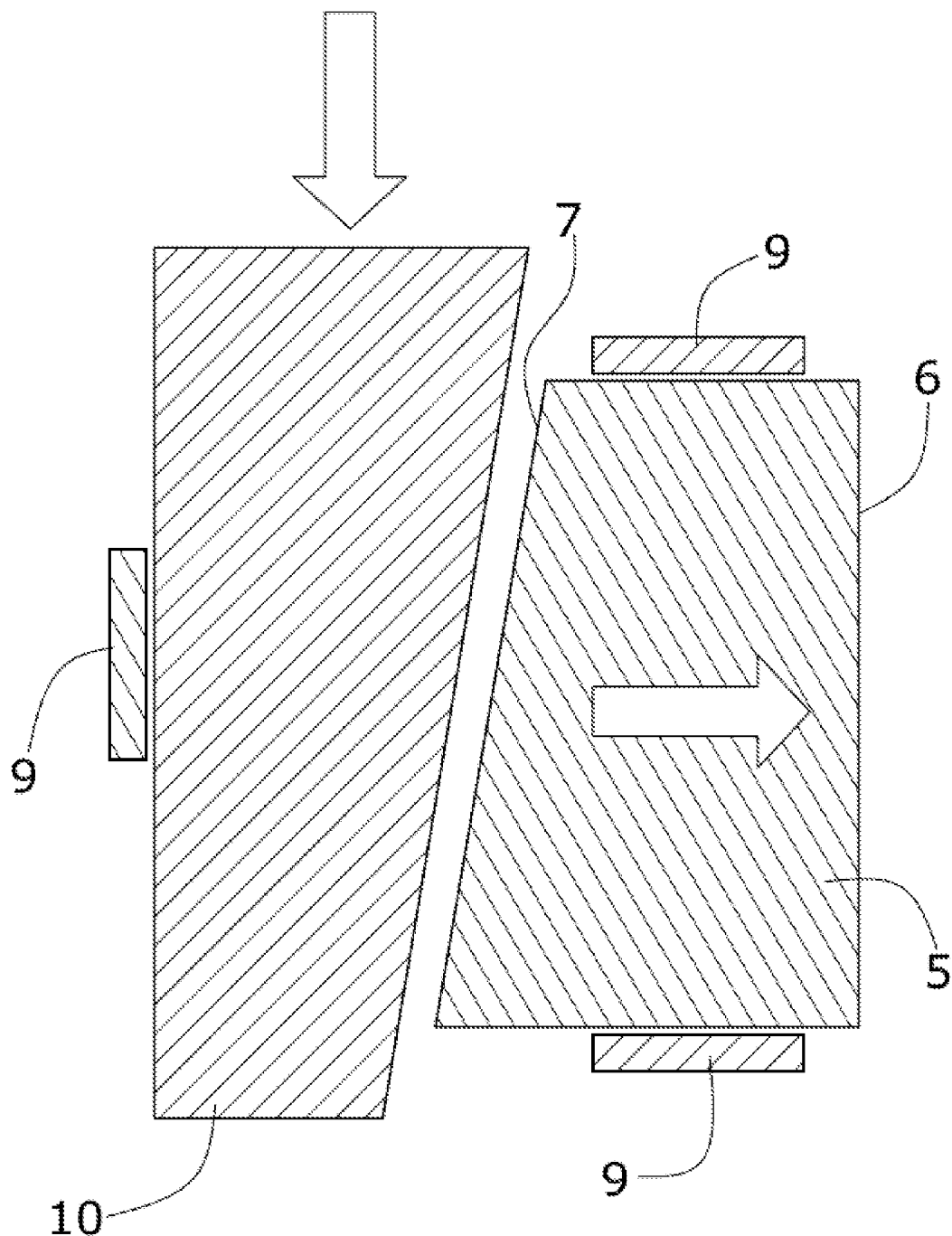
FIG. 1 is a schematic view of a fixation element, a wedge and an attachment element.
Figure 2:
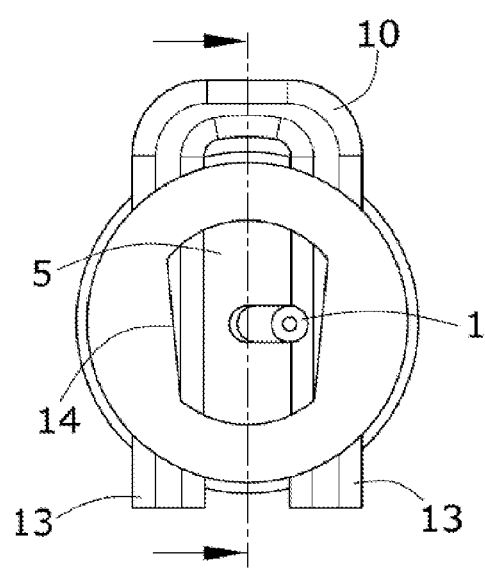
FIG. 2 is a plan view of an embodiment of the invention.

The working principle of the claimed invention is similar to a wedge, which comprises pushing the wedge (5) in the resin direction while moving the fixation element (10) in the perpendicular direction. The working principle can be seen in FIG. 1.

An embodiment is shown in FIGS. 2 to 5, which shows an example of an assembled device. The attachment element (9) comprises a piece mountable against the joint between the mold (2) and the terminal element (4) and comprising an inner cavity (14) configured so that the wedge (5) is located inside said inner cavity (14) for avoiding or preventing the displacement of the wedge (5) parallel to the mold (2). Said attachment element (9) can be directly joined to the mold (2), being an integral part of it.

The attachment element (9) comprises at least a hole (12) in connection with the inner cavity (14) configured so that the fixation element (10) is able to be inserted into the hole (12) and to be moved against the wedge (5) without any displacement in the direction perpendicular to the mold (2).

More specifically, the fixation element (10) has a horseshoe arch-like shape with two legs (13), the attachment element (9) having two holes (12) for every leg (13) so that by pushing the horseshoe arch-like shape, the pipe (1) plus the terminal element (4) are pressed against the injection mold (2).

The resin injection pipe (1) can be manufactured with the terminal element (4), having for instance a cone shape, both of them co-injected together as a single part as both are made out of the same material, silicone. The terminal element (4) is inserted into the mold (2), which should have the proper conical shape to adjust the cone, center it into the injection hole (3) and achieve a good sealing when it is deformed by pressure.

As silicone is a deformable material, the wedge (5) presses and deforms the silicone terminal element (4), thus improving the sealing effect over the mold (2) conical surface. This sealing is achieved by coupling the effects of a mere displacement perpendicular to the mold (2) with a sealing compression force by deformation of the conical terminal element (4) against the mold (2).

Another advantage of having a co-injected terminal element (4) is that the joint between the injection tube (1) and the terminal element (4) avoids or prevents vacuum leakages.

Figure 3:
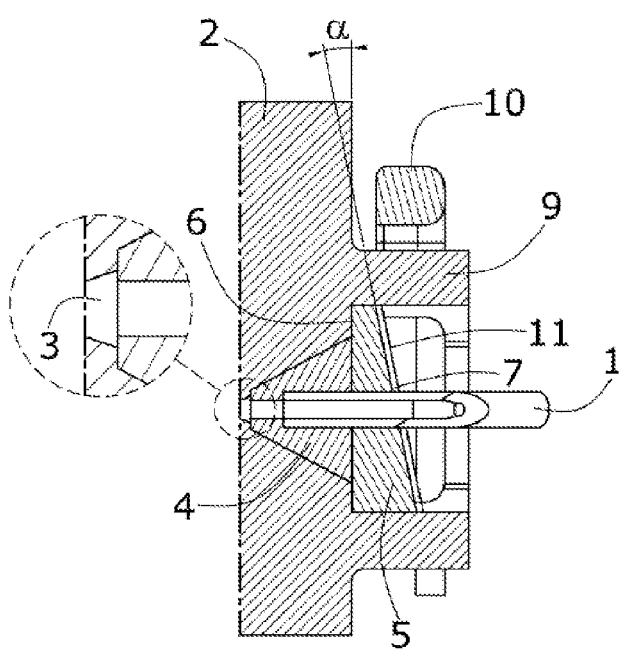
FIG. 3 is a cross section of the embodiment shown in FIG. 2.

FIG. 3 discloses an injection hole (3) that has a conical shape adapted to receive the terminal element (4) and an end part having a short thickness which also has a conical shape that makes the cleaning of the tooling injection holes (3) easier after the piece is cured by helping the solidified resin to be removed with the extraction of the terminal element (4), because resin is trapped between the terminal element (4) and the injection hole (3), the terminal element (4) being disposable together with the wedge (5) and the injection tube (1).

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. An injection interface device, to be located between an injection tube and a mold provided with an injection hole, the injection tube comprising a terminal element at its end which is able to be introduced into the injection hole for forming a seal between the injection hole and the terminal element, the injection interface device comprising:
   a wedge comprising a first surface mountable against the terminal element and a second surface being inclined with respect to the first surface,
   a fixation element comprising a surface mountable against the second surface of the wedge and movable with respect to said second surface,
   an attachment element configured so that the attachment element prevents movement of the wedge in a direction parallel to the mold surface and also configured so that it prevents movement of the fixation element in a direction perpendicular to the mold,
   the wedge, the fixation element and the attachment element being configured so that a displacement of the fixation element parallel to the mold produces a displacement of the wedge in a direction perpendicular to the mold so that the wedge presses against the terminal element to seal a joint between the injection hole and the terminal element.

2. The injection interface device, according to claim 1, wherein the attachment element comprises a piece mountable around a joint between the mold and the terminal element and comprising an inner cavity configured so that the wedge is located inside said inner cavity, for preventing its movement parallel to the mold.

3. The injection interface device, according to claim 2, wherein the attachment element comprises at least a hole in connection with the inner cavity configured so that the fixation element is able to be inserted into the hole and to be moved over the wedge without any displacement in the direction perpendicular to the mold.

4. The injection interface device, according to claim 3, wherein the fixation element has a horseshoe arch-like shape having two legs, the attachment element comprising two holes for every leg.

5. The injection interface device, according to claim 1, wherein the terminal element and the injection tube are co-injected.

6. The injection interface device, according to claim 5, wherein the terminal element and the injection tube are made of the same material.

7. The injection interface device, according to claim 1, wherein the terminal element is made of silicone.

8. The injection interface device, according to claim 1, wherein the terminal element has a conical surface.

* * * * *